United States Patent [19]

Tiedeck

[11] Patent Number: 4,834,824

[45] Date of Patent: May 30, 1989

[54] METHOD OF MAKING A FOAMED-IN-PLACE GASKET

[75] Inventor: Michael T. Tiedeck, Harper Woods, Mich.

[73] Assignee: Preform Sealants, Inc., Warrensville, Ohio

[21] Appl. No.: 146,255

[22] Filed: Jan. 20, 1988

[51] Int. Cl.$^4$ .............................................. B32B 3/02
[52] U.S. Cl. .................................. 156/230; 156/247; 156/291; 156/350; 206/454; 206/460
[58] Field of Search ............... 156/230, 234, 235, 240, 156/540, 541, 247, 249, 291, 356, 350; 118/697; 206/453, 454, 460

[56] References Cited

U.S. PATENT DOCUMENTS

| | | | |
|---|---|---|---|
| 3,385,462 | 5/1968 | Deldime et al. | 206/454 X |
| 3,427,776 | 2/1969 | Lake et al. | |
| 3,477,867 | 11/1969 | Hillier | |
| 3,653,673 | 4/1972 | Green | |
| 3,925,947 | 12/1975 | Meyers et al. | |
| 3,950,204 | 4/1976 | Williams | 156/235 |
| 4,072,340 | 2/1978 | Morgan | |
| 4,139,234 | 2/1979 | Morgan | |
| 4,181,313 | 1/1980 | Hillier et al. | |
| 4,254,960 | 3/1981 | Jelinek | |
| 4,364,595 | 12/1982 | Morgan et al. | |
| 4,437,266 | 3/1984 | Keller | |
| 4,458,628 | 7/1984 | Fujii et al. | 118/697 |
| 4,463,523 | 8/1984 | Mailand et al. | |
| 4,634,132 | 1/1987 | Jelinek | |
| 4,728,380 | 3/1988 | Jones et al. | 156/235 X |

OTHER PUBLICATIONS

Catalogue of Nordson Corporation, located at 350 Research Court, Technology Park/Atlanta, Norcross, GA entitled "The FoamMelt System—Expanding the World of Adhesives and Sealants", © 1985, Nordson Corp., 306-18-680, six (6) pages.
Catalogue of American Robot, located at 121 Industry Drive, Pittsburgh, PA 15275, entitled "The Preferred Solution for Automotive and General Industry Manufacturing", eight (8) pages.

Primary Examiner—David Simmons
Attorney, Agent, or Firm—Dykema Gossett

[57] ABSTRACT

The method of making a foamed-in-place gasket comprising mounting a coated release board upon a work support and robotically applying a continuous sealant bead upon the release board in a predetermined pattern corresponding to a pattern of securing engagement of a work piece, such as a window assembly, to a vehicle body. The gasket and release board assemblies may be stacked in cartons and shipped to another location where additional method steps are employed including applying the sealant bead and release board to the work piece with the sealant bead retained in securing engagement with the work piece. Thereafter, the release board is stripped from the sealant bead and the work piece such as a window assembly is secured to the support such as a vehicle body.

23 Claims, 4 Drawing Sheets

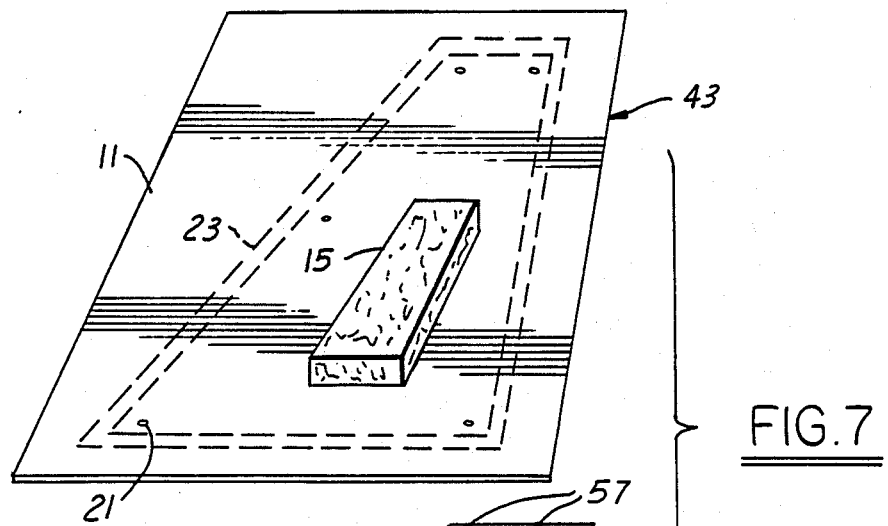
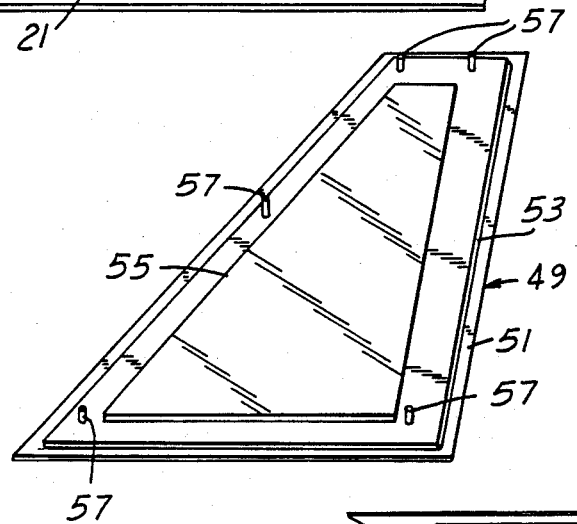
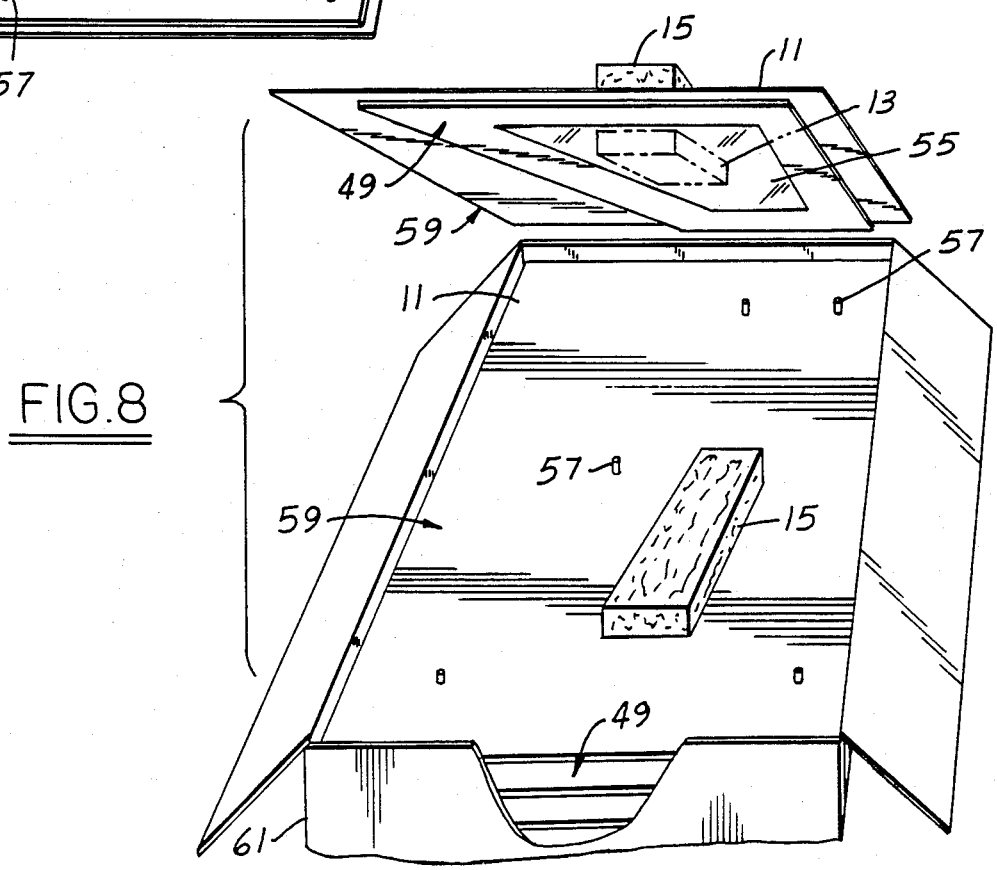
FIG. 7
FIG. 8

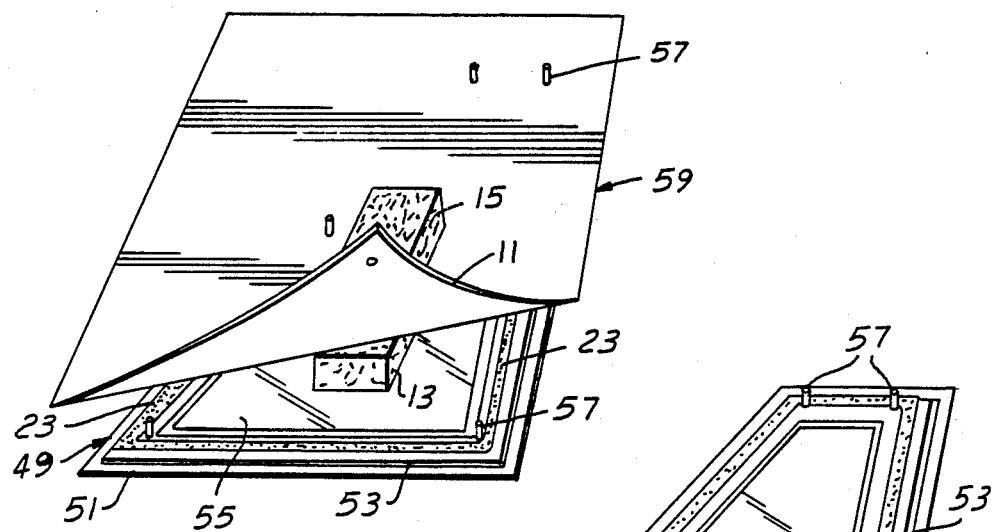
FIG. 9
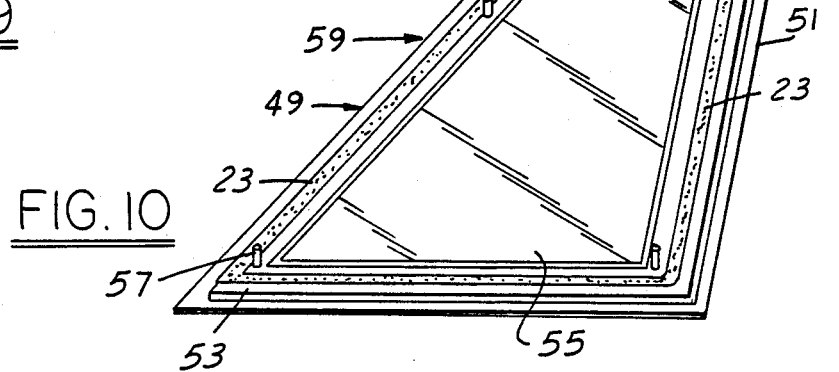
FIG. 10
FIG. 11
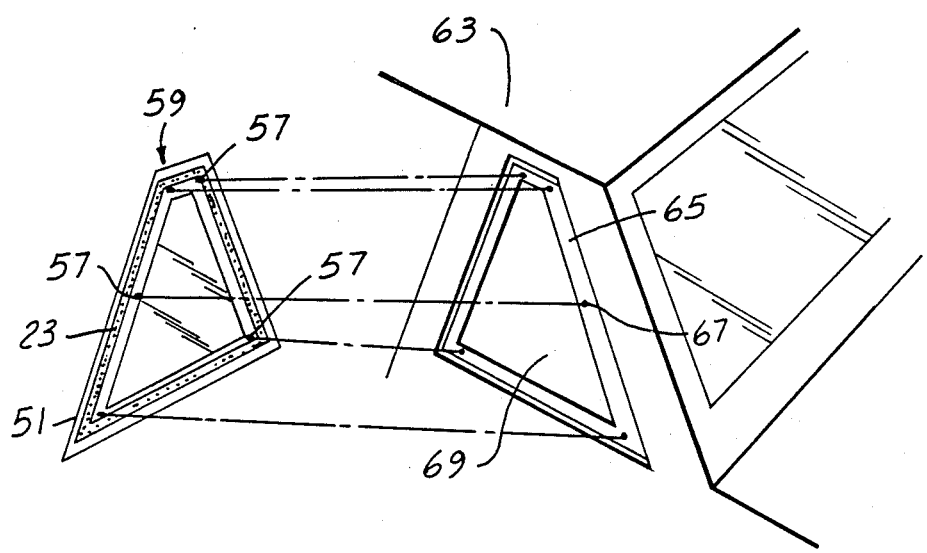

METHOD OF MAKING A FOAMED-IN-PLACE GASKET

FIELD OF INVENTION

The invention relates to the making of a foamed-in-place gasket for a work piece to be mounted upon a support.

BACKGROUND OF THE INVENTION

Previously gaskets have been die cut from various materials, have been molded from plastic material or have been molded onto or applied to work pieces or other objects for ultimate sealing thereof to a support.

Previously polyurethane incapsulated windows have been installed upon vehicle bodies. One piece window frame units have been produced in a one step reaction injection molding (RIM) process. Progress in RIM incapsulation has been rapid. The RIM process makes possible the production of automotive window gaskets that remains strong and are molded around the glass to form a sealing function.

THE PRIOR ART

Prior art examples of gasket constructions are shown in the following U.S. Pat. Nos.: 3,427,776, Lake et al., Feb. 18, 1969; 3,477,867, Hillier, Nov. 11, 1969; 3,925,947, Meyers, Dec. 16, 1975; 4,139,234, Morgan, Feb. 13, 1979; 4,437,266, Keller, Mar. 30, 1984; 4,634,132, Jelinek, Jan. 6, 1987.

SUMMARY OF THE INVENTION

An important feature of the present invention relates to the method of making a foamed-in-place gasket for a work piece to be mounted upon a support which includes applying a continuous sealant bead upon a coated release board and transferring the sealant bead to a work piece.

Another feature includes the steps of mounting and locating a coated release board upon a support, applying a continuous sealant bead upon the release board in a predetermined pattern corresponding to a pattern of securing attachment of a modular work piece to a support and applying the sealant bead and connected release board to the modular work piece with the sealant bead in snug securing engagement with the work piece and successively stripping the release board from the sealant bead.

Still another feature, the work piece is a modular window assembly and the support is a vehicle body.

A further feature includes the step before mounting the release board of punching a series of accurately located holes through the release board to correspond with the position of locator mount studs upon the work piece.

A still further feature is to robotically apply a continuous sealant bead upon the release board in a predetermined pattern with the coated release board mounted upon a robotic X-Y table.

Another feature is that the sealant bead includes a foamed hot melt sealant compound which is robotically applied to the release board in a predetermined pattern.

Still another feature is that the mounting of the release board upon the robotic X-Y table includes the use of a pair of right angularly related fixturing stops which are adjustably mounted upon the table for movements along X and Y axes, respectively, and wherein there is an assurance for a particular work piece that the sealant bead will be applied to successive coated release boards in exactly the same area and of the same dimensions.

A further feature is to provide a method of making a foamed-in-place gasket which includes mounting and locating a coated release board upon a support, applying a continuous sealant bead to the release board in a predetermined pattern corresponding to a pattern of securing engagement of a modular work piece to a support and stacking a plurality of release boards with applied sealant beads into a carton for storage and shipping.

A still further feature in the method of applying a sealant bead to the work piece includes the step of stacking a plurality of release boards and assembled work pieces into a carton for storage and shipping.

Another feature includes before the step of mounting the release board upon a support table, of adhering opposed resilient setting blocks to opposite sides of the release board centrally thereof for protective engagement of adjacent glass and the glass upon modular work pieces stacked in a carton for shipping.

Still another feature is that the present release board is preferably constructed of a cardboard material and is relatively stiff to facilitate the separation and stripping of the coated release board from the sealant bead when adhered to the work piece.

As another feature of the present method, the release board has a coating such that the adhesion of the sealant bead to the board is less than its adhesion to the work piece for facilitating stripping of the release board from the sealant bead.

These and other features and objects will be seen from the following specification and claims in conjunction with the appended drawings.

IN THE DRAWINGS

FIG. 7 is a exploded perspective view of the coated release board with the sealant bead upon its under surface positioned for registry over a modular work piece such as a window assembly.

FIG. 8 is an exploded perspective view of the release board with sealant bead and setting blocks thereon as applied to a modular work piece for stacking into a storage container, fragmentarily shown.

FIG. 9 is a perspective view of the modular work piece with the release board partly stripped from the sealant bead.

FIG. 10 is a view similar to FIG. 9 with the release board and setting blocks fully stripped and with the sealant bead adhered to the modular work piece.

FIG. 11 is a schematic fragmentary and exploded perspective view of a vehicle body having an apertured window mount flange adapted to receive the modular work piece with assembled sealant bead for application thereto.

It will be understood that the above drawings illustrate merely a preferred embodiment of the invention and preferred method steps, and that other embodiments and steps are contemplated within the scope of the claims hereafter set forth.

DETAILED DESCRIPTION OF AN EMBODIMENT OF THE INVENTION

Referring to the drawngs, FIGS. 1 through 4, the present coated release board 11 is preferably constructed of a cardboard material, is of moderate thickness, is sufficiently stiff for packaging without distortion and is coated on one or both sids. The board 11 is treated or coated with silicone.

An opposed pair of setting blocks 13, 15 are laminated or otherwise adhered as at 17 by a suitable adhesive to opposite sides of the coated relese board 11 and are of a resilient material. The setting blocks may be constructed of cardboard, sytrofoam, urethane foam, expanded polystyrene or other resilient material that will not mare or scratch glass window surfaces.

Figure 1:
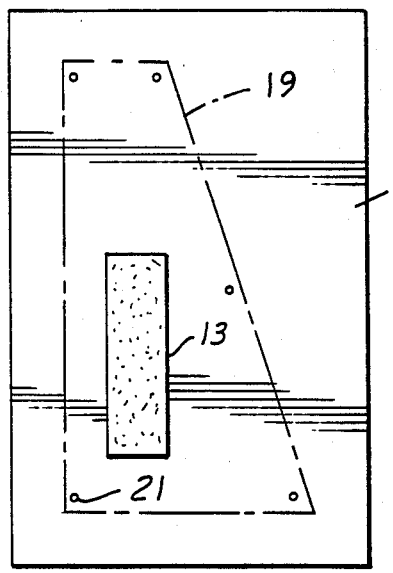
FIG. 1 is a plan view of a coated release board with setting blocks secured thereto and with a predetermined sealant bead pathway shown thereon in phantom lines.
Figure 2:
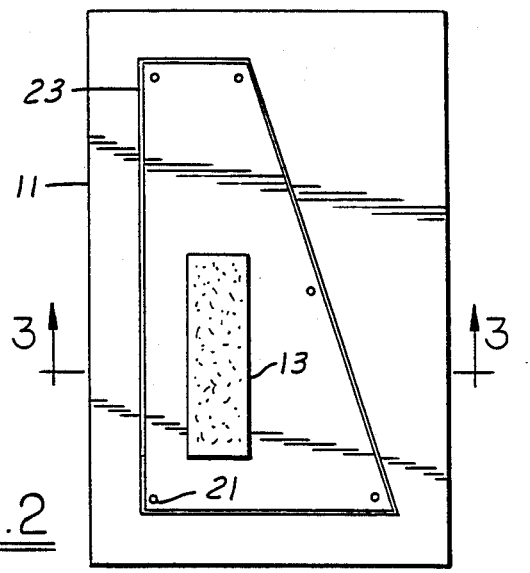
FIG. 2 is a view of a coated release board with the sealant bead applied thereto in registry with the sealant bead pathway shown in FIG. 1.
Figure 4:
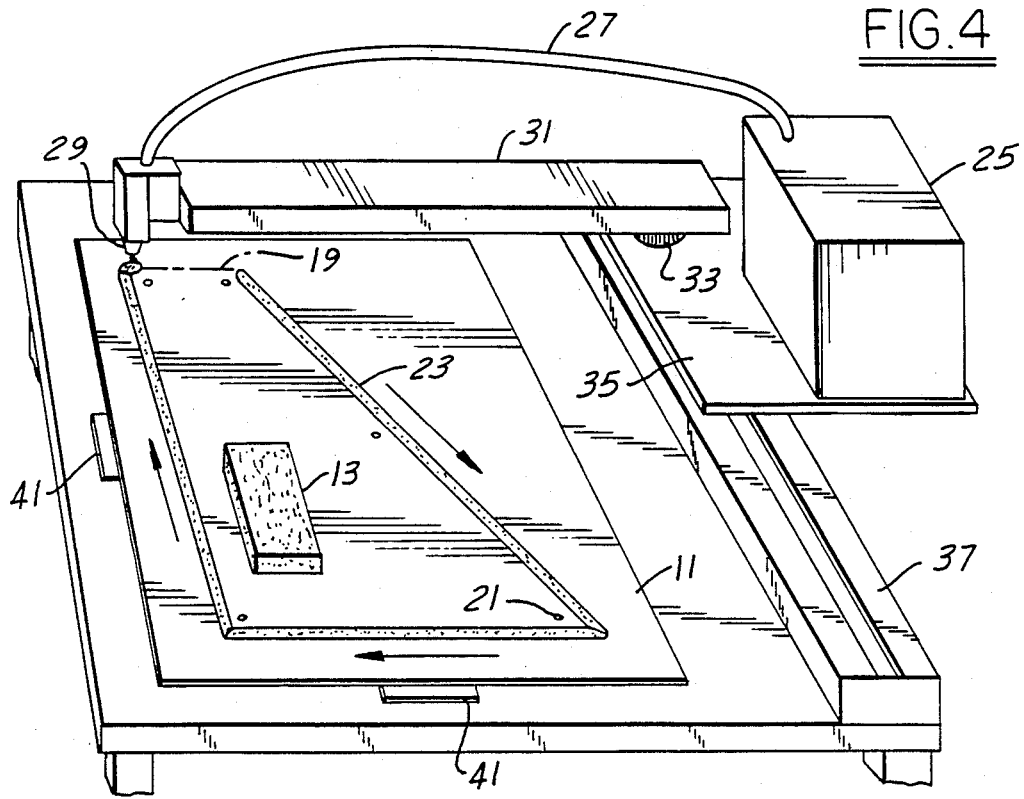
FIG. 4 is a fragmentary perspective and schematic view of the coated release board mounted upon a robotic X-Y table and a hot melt unit including a programmable robot with nozzle for applying the sealant bead to the release board.

A sealant bead pathway is designated at 19, in FIG. 1, as predetermined over which is to be applied a sealant bead 23, such as shown in FIGS. 2 and 4, manually or robotically. The sealant bead 23 is made from a blended hot melt rubber based, polymer adhesive material. A series of spaced holes 21 are punched through the release board 11, spaced along and inwardly of sealant bead pathway 19 and are adapted to receive protruding modular work piece locator studs 57 as shown in FIG. 7. Holes 21 are punched by a standard punch press or similar tool.

The present sealant bead 23 consists of a foamed hot melt sealant compound and is supplied in a continuous manner from the pressurized hot melt unit 25, schematically shown in FIG. 4. The hot melt unit includes an internal pumping mechanism and is of the type manufactured by Nordson Corporation of Norcross, Ga. 30092. The hot melt unit 25 is adapted for feeding molten or hot melt polymer sealant material through the flexible header 27 and through the nozzle 29 supported on one end of the programmable robot arm 31. The robotic construction, for illustration, is marketed by American Robot Corporation of Pittsburgh, Pa. 15275. The present robotic arm 31 is pivotally mounted at 33 upon platform 35. The platform 35 is adjustably mounted along a Y axis relative to the slotted guide 37 upon the X-Y table 39. This provides for two dimensional adjustment for robot arm 31 relative to the X-Y axes of support 39.

Since it is important that the silicone coated release board 11 for a particular work piece be mounted upon a suitable support such as the X-Y table 39 in an exact location there are provided a pair of spaced right angular related fixturing stops 41. These are adjustably mounted upon and with the respect to X-Y axes of the support or X-Y table 39, in retaining registry with corresponding right angularly related edges of release board 11.

Figure 5:
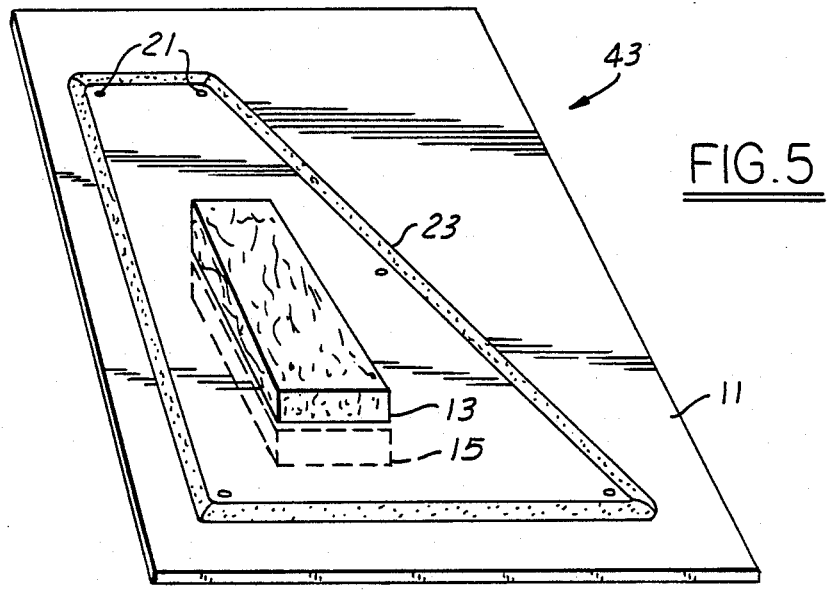
FIG. 5 is a perspective view of the release board with the sealant bead and pair of setting blocks applied thereto.

The present robotically applied continuous sealant bead 23 has been applied over the sealant bead pathway 19 substantially throughout the complete perimeter thereof, FIG. 4, and is shown completed in FIG. 5. Here the release board 11 is removed from the support or table 39, and the sealant bead is adhered to the release board in an assembly sometimes referred to as the gasket assembly 43.

Figure 6:
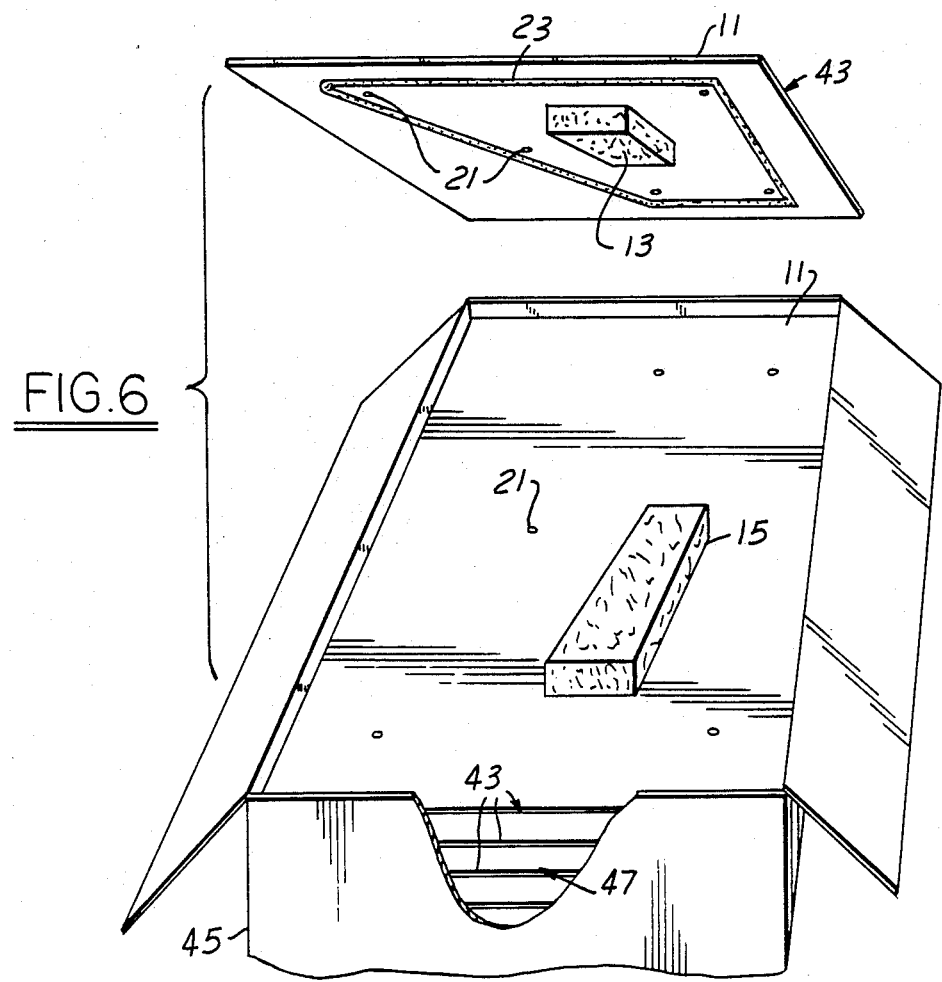
FIG. 6 is a fragmentary exploded view of the release board of FIG. 5, inverted for stacking within a carton for shipping.

As a further step in the present method the respective gasket assemblies 43 with the respective sealing blocks 13 and 15 adhered thereto are inverted as in FIG. 6, and stacked within carton 45, fragmentarily shown, for storage. The cartons 45 are subsequently shipped to manufacturers of the work pieces or modular work pieces, namely the present vehicle window assemblies 49, FIG. 7. The size the shipping carton 45 is substantially the same as the perimeter of the release board and sealant bead assembly 43 to facilitate packing thereof within the carton and removal therefrom as needed. The stacking is generally designated as 47 in FIG. 6, with the assembly 43 facing downwardly from the position shown in FIG. 5.

The packaged assemblies 43 when received by the work piece manufacturer, and in this case the manufacturer of the modular vehicle window 49, are successively removed from the carton 45 and applied with the beading 23 facing downwardly onto the corresponding modular window assembly 49, FIG. 7. The corresponding openings 21 in the release board are in cooperative registry with and receive the locator studs 57 fixed upon the work piece 49.

This brings the sealant bead 23 upon the under surface of the release board 11 into snug registry with the apertured flange 53 located upon the planar window frame 51 which is similarly apertured. The corresponding window glass 55 is sealed within peripheral internal openings within the mount flange 53. The locator studs 57 indicate with respect to the mount flange 53 a mount area outward thereof for cooperative registry with the sealant bead 23.

In many situations it may be desirable to apply selectively to the apertured mount flange 53 a suitable solvent wipe or sealant primer so that the mounting surface for the sealant bead is perfectly clean so that the adhesion of the sealant bead 23 with respective to the window assembly 49 is greater than the adhesion between the sealant bead 23 and the release board 11. The primary purpose of employing a coated release board is to accomplish the result that the adhesion between the bead 23 and the coated release board 11 will be less than the adhesion between the bead 23 and the work piece support surface 53.

Upon the assembly of the inverted coated release board over the work piece 49, in FIG. 2, some pressure is applied to the release board 11 for a snug registry of the bead 23 against the work piece 49. The assembly when completed in FIG. 7 is stacked as at 59 into shipping carton 61, fragmentarily shown. The carton 61 is of a dimension so as to loosely and cooperatively receive the assembly of the modular work pieces and release boards and also to prevent lateral movements during shipping.

This assembly of a plurality of modular work pieces, FIG. 8, in a stack within the shipping carton 61 as now shipped to the auto manufacturer for example as designated at 59, FIG. 9. Here as each assembly 59 is removed from the carton, or thereafter, the release board 11 including blocks 13 and 15 is successively stripped relative to the sealant bead 23. The bead 23 remains secured upon the work piece 49 while the release board 11 is fully removed from the work piece, FIG. 10.

The present work piece, namely the modular vehicle window assembly 59, FIG. 10, is now ready for application to and securing to vehicle body 63, schematically shown fragmentarily in FIG. 11. The vehicle body 63 includes the window flange 65 or mount surface having a series of longitudinally spaced holes 67 therein adapted to cooperatively receive the threaded locator studs 57 upon the modular work piece 59 and the bead assembly 23. The studs 57 are projected through the holes 67 within the vehicle body 63 and adjacent window flange 65 having window opening 69. The continuous sealant bead 23 is in cooperative snug sealing registry against the window flange 65 throughout 360 degrees. At that time suitable fasteners are applied to the locators studs 57 upon the interior of the vehicle body until the complete modular window assembly 59 and bead 23 have been snugly secured to the vehicle body. Thus the sealant bead 23 peripherally seals the modular window assembly 59 to the vehicle body 63 throughout 360 degrees for excluding moisture, dirt and any air transfer between the exterior to the interior of the vehicle body.

One source of the foam melt process equipment 25 is the Nordson Company of Norcross, Ga. who developed a foam melt process which mixes an inert gas with hot melt polymer materials. The gas, usually carbon dioxide or nitrogen, is forced into a solution with the hot melt polymer material during the pumping process. When the hot melt/gas solution is applied to a substrate, such as the release board 11, FIG. 4, as through header 27 and nozzle 29 for producing the continuous sealing bead 23, the pressure is relieved, allowing the gas to come out of solution and form a foamed hot melt material. Depending on the nature of the hot melt material and external forces, the gas bubbles that form the foam may remain trapped in the hot melt even after the material cools. If the material cools with the gas bubbles intact, a semi-rigid closedcell foamed product is formed. If the foamed material is compressed prior to cooling, the foamed material collapses, releasing the gas to form a conventional bond and a bead of substantially uniform thickness.

It is contemplated as a part of the present invention that though there has been defined in FIG. 4, that the sealaant bead 23 is robotically applied to the release board upon robotic X-Y table, the sealant bead could be applied manually in some other form in order to follow pattern 19 upon the release board 11, FIG. 1.

In the illustrative embodiment for robotically applying a continuous sealant bead to the release board, robotic equipment supplied by the American Robot Company of Pittsburgh, Pa. may be used. Other robotic apparatus could be employed in the present method. Robotic apparatus has a characteristic of high speed and precise repeatability with advance controller architecture. The present robotic device, FIG. 4, supplies a continuous bead of sealant 23 quickly and accurately. It is contemplated as a part of the present invention that the continuous sealing bead may be applied to the release board other than robotically. The continuous sealant bead 23 is applied to release board 11 in a predetermined pattern 19, corresponding to the pattern of securing enagement of the modular work piece to a support.

Figure 3:
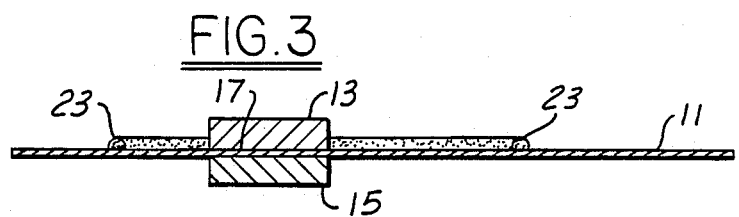
FIG. 3 is a framentary section taken in the direction of arrows 3—3 of FIG. 2, on an increased scale.

As an initial step in the present method, the starting point is a release board 11 which has been properly coated on one or both sides but at least one side, as shown in FIGS. 1, 2 and 3. The release board 11 before application to the support has laminated or otherwise secured thereto a pair of opposed setting blocks 13 and 15. These are made of such resilient material as will not mar or scratch modular glass surfaces, such as wherein the assemblies 59, FIG. 8, ar stacked in carton 61 for shipping. Here the setting blocks 13 and 15 are adapted for yieldable engagement with the adjacent glass of a modular window assembly. The setting blocks may be sculpted to conform to crowned glass or may be flat with enough compression and recovery to conform to such glass surfaces upon packaging, FIG. 8.

The particular design of the modular work piece, namely the vehicle window assembly 49 in FIG. 10, is for illustrative purposes only. It is contemplated that numerous other designs are possible. The continuous sealant bead 23 is applied to the release board in a predetermined pattern 19, FIG. 1, which corresponds to the pattern of securing engagement of the particular selected modular work piece to a particular support.

In the illustrative process the hot melt unit 25 feeds molten sealant through header 27 and nozzle 29 is guided by a programmable robot schematically shown at 31, 35 and 37, including the X-Y table 39, FIG. 4.

Other robotic systems are capable of applying the sealant bead 23 to the product. Examples are: magnet robots and articulated arm robots, as well as hard tooling robots. The applicant of the sealant by the robotically guided hot melt nozzle 29 is at approximately 1 inch of sealant per second. Such sufficient fixturing to the X-Y table 39 or alternate support is employed which will ensure that the sealant bead 23 is applied consistently in the same location to the release board 11. This is necessary because release board 11 has a plurality of pre-punched holes 21 therein for use by the modular window locator studs 57. It is further required that the bead locator studs 57 proximity is maintained constantly, hence the use of a consistent repeatable programmable robot is employed for application of the continuous sealant bead 23. Before application of the sealant bead, the locator stud holes 21 are accurately punched out of the sealant board 11 using, as an example, a standard punch press.

FIGS. 5 and 6 show the completed assembly 43 of the double sided release board 11 with setting blocks 13 and 15, sealant bead 23 and with holes 21 for the modular locator pins 57, now ready for packaging, FIG. 6. This assembly is stacked in a standard cardboard carton 45, fragmentarily shown. The box size must conform to the outside perimeter of the release board 11 thereby avoiding damage in transit to the assembly 43.

The product or assembly 43 is shown inverted in FIG. 6 with the sealant bead 23 facing down. Under some conditions it may be desirable for the product to be packaged face up. This is an option of the manufacturer. Once packaged the products are ready to be shipped to the modular manufacturer.

FIGS. 7 and 8 illustrate assembly of the product to modular window 49. The locator studs 57 are positioned within locator stud holes 21 on release board 11. Manual pressure is applied to release board 11 upon the opposite side of beading 23. The setting block 13 rests on the glass of the adjacent modular window. The upwardly positioned packing block 15 is adapted for cooperative registry with the succeeding window assembly 49 mounted within the carton 61 as a part of the stack 49.

The module combination is now ready for packaging, as in FIG. 8, for storage and shipment. The modular product combination is packaged so that the locator studs 57 point towards the top of the carton. This will allow sealant bead 23 to rest upon modular mating surfaces thereby assuring a good seal and bond to themodular work piece. The setting blocks 13 and 15 must be of such sufficient height to prevent the locator pins 57 from touching the modular window 55 to avoid scratching or marring of the glass surface. The product module combination is ready to be shipped to the automotive assembly plant.

Referring to FIGS. 9, 10 and 11, after the product module combination arrives at the automotive assembly plant, the release board will be stripped from the modular window or other product. The stripping will be such that the sealant bead is not removed but remains attached as at 23 to flange 53 of the modular window assembly. This is primarily because there is more adhesion between the bead 23 and the modular work piece than bead 23 and the coated release board 11, FIG. 9. When the release board 11 and the setting blocks 13 and 15 are removed from the module the release board and blocks 13 and 15 are discarded as unusable packaging.

FIG. 11 illustrates the completed module and sealant bead 23 with a sealant bead now ready for installtion into the automobile and upon the mount flange 65, FIG. 11, on the vehicle body fragmentarily shown at 63.

In FIG. 11 the automobile body 63 is fragmentarily shown with window flange 65 having a series of spaced apertures 67 to cooperatively receive the locator studs 57, the window opening being designated at 69.

The installer after stripping the release board 11 from the work piece 49, FIG. 9, will assembly the modular window sealant bead assembly 59 over the window opening 69, FIG. 11, for locator stud attachment through holes 67, using properly specified nuts and pre-set nut drivers for anchoring the locator studs 57 to the vehicle body flange 65. When the last nut is assembled to the last locator stud 57, the modular window has been installed and the sealant bead 23 is not visible. The sealant bead will exclude moisture, dust and wind noise on the inside of the vehicle and assist in adhering the modular window to the vehicle body.

THE METHOD

The present method basically includes the step of mounting and locating a coated release board 11 upon a suitable support or upon robotic X-Y table 39, FIG. 4. A further step includes robotically or otherwise applying a continuous sealant bead 23 upon the release board 11 in a predetermined pattern 19, FIG. 1. This pattern corresponds to the pattern 19, FIG. 1, of securing engagement of a modular work piece to a support. A further step, FIG. 6, includes stacking at 47 a plurality of release boards 11 with applied sealant beads 23 into carton 45 for storage and shipping. This is a packaging system.

The foregoing method includes the additional step before mounting the release board upon a support, of punching a series of accurately located holes 21 through the release board 11 to correspond with the position of locator mount studs 57 upon the work piece 49.

The present method includes the additional step before mounting the release board upon support 39 of adhering opposed resilient setting blocks 13 and 15 to opposite sides of the release board 11 centrally thereof.

The present method includes the further step of applying the sealant bead 23 and connected release board to a modular work piece 49 with the sealant bead 23 in snug engagement with the modular work piece. Some manual pressure may be applied to the back side of the release board.

As a further step a plurality of assembled release boards, beadings, and modular work pieces are stacked within a carbon for packaging and shipping.

With respect to the method of making a foamed-in-place gasket the work piece may be a modular vehicle window assembly such as shown in FIG. 7 and the support therefore may be a vehicle body 65 fragmentarily shown in FIG. 11. The present method further includes the stripping of the release board 11 from the sealant bead 23.

As a further step, wherein the vehicle body includes a continuous mount flange 65 having a plurality of spaced apertures 67 therethrough, includes locating and applying the modular work piece 59 to the vehicle mount flange 65 with the sealant bead 23 in continuous registry with the mount flange 65 and with the mount studs 57 projecting into the corresponding apertures 67 of the vehicle body for securing thereto. The sealant bead 23 peripherally seals the modular window to the vehicle body throughout 360 degrees excluding moisture, dirt and air transfer.

Having described my invention reference should now be had to the following claims.

I claim:

1. A method of making a foamed-in-place gasket comprising steps of: mounting and locating each of a plurality of coated release boards upon a robotic X-Y table, each release board being sufficiently stiff for packaging without distortion;

robotically applying a respective, continuous sealant bead upon each release board in a predetermined pattern corresponding to a pattern of securing engagement of one work piece of a plurality of modular work pieces to a repective support;

applying the respective sealant bead and connected release board to said one modular work piece with the respective sealant bead in snug securing engagement with said one modular work piece;

packaging a plurality of assemblies of each said respective sealant bead in snug securing engagement with each said one modular work piece, by stacking said plurality of assemblies into a carton for storage and shipping; and successively stripping each release board from each respective sealant bead so as to leave said each respective sealant bead adhered to said each one modular work piece in substantially said pattern of securing engagement.

2. In the method of claim 1, an additional step, before applying sealant bead to the work piece, of wiping selectively a solvent and sealer primer over the mating surface of the work piece so that adhesive of the sealant bead to the work piece is greater than its adhesion to said release board.

3. In the method of claim 1, said work pieces being a modular vehicle window assembly, including window glass, said support being a vehicle body.

4. In the method of claim 1, an additional step, before mounting the release board, of punching a series of accurately located holes through the release board to correspond with the position of locator mount studs upon the work piece.

5. In the method of claim 1,
said sealant bead including a foamed hot melt sealant compound.

6. In the method of claim 1,
the locating of said release board upon the robotic X-Y table including a pair of right angularly related fixturing stops adjustably positioned upon said table for movements along X and Y axes.

7. In the method of claim 1,
an additional step, before mounting the release board, of adhering opposed resilient setting blocks to opposite sides of said release board centrally thereof.

8. In the method of claim 1,
said release board having a coating so that the adhesion of the sealant bead to said board is less than its adhesion to said work piece, facilitating the stripping of said release board from said sealant bead.

9. In the method of claim 1,
said release board being constructed of a carboard material.

10. In the method of claim 3,
a step, before applying the respective sealant bead and connected release board to said one modular work piece, of adhering opposed resilient setting blocks to opposite sides of said release board centrally thereof,
said setting blocks protectively and yieldably engaging the window glass of an adjacent stacked release board and window assembly.

11. In the method of claim 3,
said vehicle body including a continuous mount flange having a plurality of spaced apertures therethrough; the further step of
locating and applying the modular work piece to said mount flange with said sealant bead in continous registry with said mount flange and with said mount studs projected into the corresponding apertures of said vehicle body mount flange for securing thereto;
said sealant bead peripherally sealing the modular window to the vehicle body through 360 degrees, excluding moisture, dirt and air transfer.

12. In the method of claim 4,
the step of applying the sealant bead and release board including positioning the locator holes in the release board over corresponding mount studs upon the work piece.

13. A method of making a foamed-in-place gasket comprising steps of: mounting and locating each of a plurality of coated release boards upon a robotic X-Y table, each release board being sufficiently stiff for packaging without distortion;
robotically applying a respective, continuous sealant bead upon each release board in a predetermined pattern corresponding to a pattern of securing engagement of one work piece of a plurality of modular work pieces to repective support; and
packaging a plurality of release boards with applied sealant beads, by stacking said plurality of release boards with applied sealant beads into a carton for storage and shipping.

14. In the method of claim 13,
an additional step, before mounting the release board, of punching a series of accurately located holes through the release board to correspond with the position of locator mount studs upon the work piece.

15. In the method of claim 13,
said work piece being a modular vehicle window assembly, said support being a vehicle body;
said modular window assembly including a frame; and
a planar flange upon the frame apertured to receive and retain a window glass, said mount studs defining a continuous attachment area upon said flange, said sealant bead being in a continuous registry with said attachment area.

16. A method of making a foamed-in-place gasket comprising steps of: mounting and locating each of a plurality of coated release boards upon a first support, each release board being sufficiently stiff for packaging without distortion;
applying a respective, continous sealant bead upon each release board in a predetermined pattern corresponding to a pattern of securing engagement of one work piece of a plurality of modular work pieces to a respective second support;
applying the respective sealant bead and connected release board to said one modular work piece with the respective sealant bead in snug securing engagement with said one modular work piece;
packaging a plurality of assemblies of each said respective sealant bead in snug securing engagement with each said one modular work piece, by stacking said plurality of assemblies into a carton for storage and shipping; and
successively stripping each release board from each respective sealant bead so as to leave said each respective sealant bead adhered to said each one modular work piece in substantially said pattern of securing engagement.

17. In the method of claim 16,
said work piece being a modular vehicle window assembly including window glass, said second support being a vehicle body.

18. In the method of claim 16,
an additional step, before mounting the release board, of punching a series of accurately located holes through the release board to correspond with the position of locator mount studs upon the work piece.

19. In the method of claim 17,
said vehicle body including a continuous mount flange having a plurality of spaced apertures therethrough; the further step of
locating and applying the modular work piece to said mount flange with said sealant bead in continuous registry with said mount flange and with said mount studs projected into the corresponding apertures of said vehicle body mount flange for securing thereto;
said sealant bead peripherally sealing the modular window to the vehicle body through 360 degrees, excluding moisture, dirt and air transfer.

20. In the method of claim 16,
said work piece being a modular vehicle window assembly, said support being a vehicle body;
said modular window assembly including a frame; and
a planar flange upon the frame apertured to receive and retain a window glass, said mount studs defining a continuous attachment area upon said flange, said sealant bead being in continuous registry with said attachment area.

21. In the method of claim 17, a step, before applying respective sealant bead and connected release board to said one modular work piece, of adhering opposed resilient setting blocks to opposite sides of said release board centrally thereof, said setting blocks protectively and yieldably engaging the window glass of an adjacent stacked release board and window assembly.

22. In the method of claim 17, the step of applying the sealant bead and release board including positioning the locator holes in the release board over corresponding mount studs upon the work piece.

23. In the method of claim 19, an additional step, before mounting the release board, of punching a series of accurately located holes through the release board to correspond with the position of locator mount studs upon the work piece.

* * * * *